United States Patent [19]

Annen

[11] 4,096,317

[45] Jun. 20, 1978

[54] COATED ABSORBENT BARRIER PROTECTING SEPARATOR AND BATTERY EMBODYING SAME

[75] Inventor: James Herbert Annen, McFarland, Wis.

[73] Assignee: ESB Incorporated, Philadelphia, Pa.

[21] Appl. No.: 767,868

[22] Filed: Feb. 11, 1977

Related U.S. Application Data

[63] Continuation-in-part of Ser. No. 606,517, Aug. 21, 1975, abandoned.

[51] Int. Cl.² .......................... H01M 2/16; B32B 5/28
[52] U.S. Cl. .................................. 429/145; 429/254; 427/245
[58] Field of Search .............. 429/145, 142, 254, 249; 427/246, 245

[56] References Cited

U.S. PATENT DOCUMENTS

| 3,345,215 | 10/1967 | Ryhiner et al. | 429/249 |
| 3,880,672 | 4/1975 | Megahed et al. | 429/206 |

*Primary Examiner*—Donald L. Walton
*Attorney, Agent, or Firm*—Gilbert W. Rudman

[57] ABSTRACT

A sealed primary galvanic cell has a barrier and barrier protecting separator. The barrier protecting separator contains the reaction product of an alkaline earth metal salt and unneutralized carboxypolymethylene. The barrier protecting separator is prepared by applying either of the treating materials in the wet state to a supporting sheet, drying and then applying the second treating material also in the wet state.

11 Claims, 3 Drawing Figures

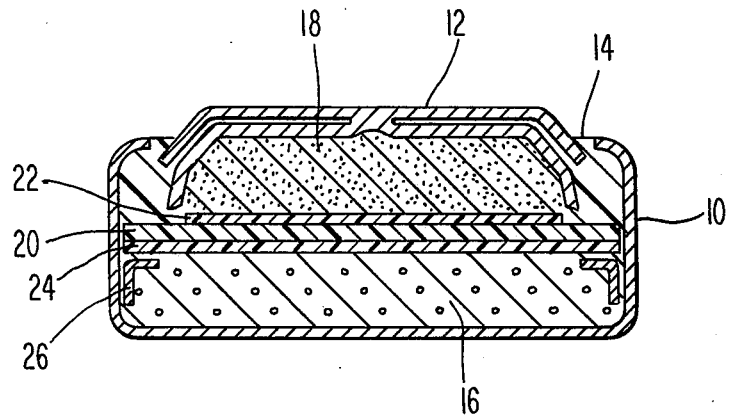
_Fig. 1_
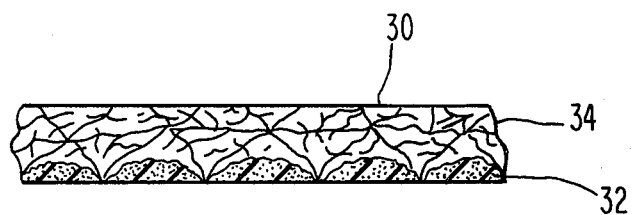
_Fig. 2_
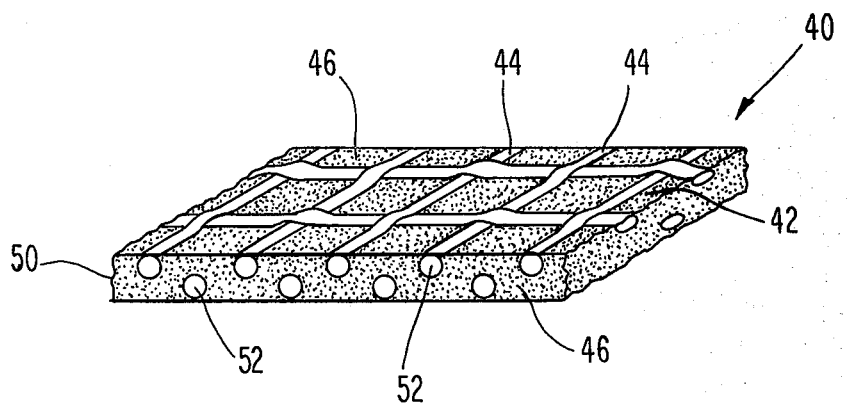
_Fig. 3_

COATED ABSORBENT BARRIER PROTECTING SEPARATOR AND BATTERY EMBODYING SAME

CROSS-REFERENCE TO RELATED APPLICATION

This is a continuation-in-part of application Ser. No. 606,517, filed Aug. 21, 1975 and now abandoned.

BACKGROUND OF THE INVENTION

1. Field of the Invention

This invention relates to sealed primary galvanic cells having alkaline electrolytes. In particular, it relates to such cells having a barrier and a barrier protecting separator between the electrodes, the barrier protecting separator containing a pore restricting material.

2. Description of the Prior Art

High energy density electrochemical systems such as silver-zinc, mercury-zinc, nickel-cadmium, silver-cadmium, manganese-zinc, and mercury-cadmium are well known in the art and used in alkaline electrolyte cells where high energy density is required. Such high energy density batteries or cells are generally battery systems which have a substantially higher energy per unit of weight than conventional, e.g. lead storage batteries. Such high energy density batteries or cells can for example develop from 100–140 watt hours of energy per pound. These batteries or cells have numerous applications such as in portable tools and appliances, televisions, radios, hearing aids, and electric and electronic watches.

In batteries or cells of this type, the barrier employed performs the function of retaining electrolyte, e.g. potassium hydroxide, separating the electrodes, and deterring migration of electrode ions such as silver ions or growth of dendrite crystals of electrode ions such as zinc ions, which can short circuit the battery. The use of organic barriers in this capacity is well known in the art, however, such use is attended by certain problems. For example, such organic barriers may not be chemically stable, particularly at temperatures above 50° C; they may tend to swell excessively or otherwise degrade. Additionally, organics are not inert to oxidizing agents in caustic solutions; can be easily punctured by dendritic growth and may not effectively prevent ion migration which will result in self-discharging of the cell. The art is further complicated by the fact that barrier systems and other design parameters which result in a battery with high rate capability, typically are suboptimal for shelf life characteristics. That is, high rate capability alkaline batteries typically have poorer shelf life than low rate capability alkaline batteries, and conversely, long shelf life batteries typically do not have high rate capability. As a result of this trade-off, separator systems are sought which strive to optimally compromise the rate capability/shelf life characteristics of a given battery system.

An organic barrier for primary alkaline galvanic cells is known comprising an organic substrate at least one side of which has adhered thereto a mixture consisting essentially of a binder material and an inorganic material wherein the inorganic material is selected from the group which consists of titanium dioxide, zirconium dioxide, aluminum sulfate, aluminum chloride, aluminum oxide, barium chloride and chromium chloride and wherein the binder material is selected from the group which consists of magnesium hydroxide, carboxy methyl cellulose, guar gum, carbopol and mixtures thereof.

A novel battery barrier protecting separator has now been discovered which will greatly improve the shelf life characteristics of high rate battery systems, while at the same time maintaining the high rate capability. The separator will also permit the redesign of low rate systems to achieve high rate capability while maintaining good shelf life characteristics.

SUMMARY OF THE INVENTION

A sealed galvanic primary cell having an alkaline electrolyte, a cathode and an anode has a barrier located between cathode and anode. A barrier protecting separator is provided to protect the barrier from the cathode. The barrier protecting separator comprises a porous sheet inert to the cell components. At least some of the pores of the separator contain the reaction product of an alkaline earth metal salt and carboxypolymethylene. The porous sheet may be a woven or non-woven fabric having fibers of materials which are non-reactive to the electrolyte of the cell. It may be a paper or it may be a porous plastic sheet. The electrolyte may combine an aqueous solution of sodium or potassium hydroxide or mixtures thereof.

The alkaline earth metal salts may be oxides, hydroxides or silicates of magnesium, barium or calcium or mixtures thereof. The principal purpose of the separator is to protect the regenerated cellulose or other barrier material from metals or metallic ions emanating from the cathode during stand.

A second purpose is to provide a reservoir of electrolyte in the vicinity of the cell cathode.

Primary cells for which the new barrier protecting separator is particularly suited include cells having for cathode materials silver oxide, mercuric oxide, nickel oxyhydroxide and manganese dioxide or mixtures of these materials. The usual anode materials for such cells are zinc and cadmium.

It has been found that cells built with the separator of the invention are improved over cells without the barrier protecting separator in their capacity retention during storage. This is a most important feature of primary cells for sale to the general public wherein the purchaser expects to obtain a product of full capacity. It has also been found that the barrier protecting separators of the invention does not detract from the high rate capabilities of the cells in which it is used.

BRIEF DESCRIPTION OF THE DRAWINGS

FIG. 1 depicts in cross section a typical cell of the present invention;

FIG. 2 depicts in cross section a barrier protecting separator of the invention; and FIG. 3 depicts in perspective a second barrier protecting separator of the invention.

DESCRIPTION OF THE PREFERRED EMBODIMENT

In FIG. 1, a sealed primary galvanic cell often known as a button cell is shown in cross section. The cell container 10 is closed by cover 12 and gasket 14. The cover 12 is a design known as a double cover and this design has been found to be particularly advantageous for button cell construction. A cathode pellet 16 is located in the bottom of the container 10. An anode pellet 18 is located under the cell cover 12. Between anode and cathode a barrier 20 is located. Many materials have been used for barriers in alkaline galvanic cells. Among them are regenerated cellulose such as cellophane or sausage casing, irradiated polyethylene, ion exchange resins supported by non-reactive carrier sheets. On the anode side of the barrier 20 an electrolyte absorber 22 is placed. This is usually a felt or non-woven fabric material made of regenerated cellulose fiber or other such easily wettable material.

On the cathode side of the barrier, a barrier protecting separator 24 is located. For convenience, the three members, electrolyte absorber 22, barrier 20 and barrier protecting separator will be termed the separation system. A barrier support 26 serves to support the periphery of the barrier 20 and of the barrier protecting separator. To complete the cell electrolyte — not shown — is placed in the cell prior to sealing. The electrolyte permeates the pores of the cathode, the anode and the separation system.

The barrier protecting separator 24 comprises a sheet of open structure such as paper, felt, or woven or non-woven fabric. Another class of sheet comprises a porous or microporous sheet as for example rubber or plastic storage battery separator material. The materials from which the substrate may be made include cellulose, nylon, dynel, polyethylene, polypropylene, polystyrene, polyvinyl chloride, etc. Likewise combinations of these and other cellulosic and acrylic fibers can be used.

In a first embodiment of the present invention, the sheet of the barrier protecting separator is first impregnated with an aqueous suspension of an alkaline earth metal salt. Typical salts include the oxides, hydroxides or silicates of magnesium, barium or calcium. The suspension may contain from about 5 to 75 percent solids. Normally the solids content is from 20 to 35%. If the pores of the sheet are small as in a paper or a microporous plastic material, a suspension of 5 to 10% solids must be used to enable the slurry to penetrate. If the sheet has large pores such as a woven material, a stiff paste such as 50 to 75% solids may be desired so as to bridge the openings. A gum such as carboxy methyl cellulose, guar gum, etc. may be used to maintain a uniform suspension. However, these additives are not essential to the invention. The sheet is impregnated by such means as dipping (for thin slurries), doctoring (for thick pastes), or other well known spreading method. After impregnation, the sheet is dried. The drying step is a necessary part of the invention. It provides adhesion between the relatively insoluble salt particles and the material of the sheet prior to the reaction step which forms the impregnant of the invention.

The next operation is the reaction step. A water solution of unneutralized carboxy polymethylene is prepared and the treated and dried sheet is wet down with this solution. A reaction occurs between the dried salt and the organic reactant. This results in the formation of a white putty-like solid material within the pores of the sheet, which is adherent to the material of the sheet. To complete the process the treated sheet is dried a second time giving a material which can be stored and handled as required for the automatic assembly of primary button cells.

The strength of the organic reactant in water can be from 0.5% to about 5%. If weaker than 0.5%, the solution tends to be too fluid and may wash the dry salts from the sheet. If the solution is much above 5%, it tends to gel and become stiff and dry and difficult to force into the sheet. A preferred range is between about 1 and 3% by weight.

A preferred salt is magnesium hydroxide ($Mg(OH)_2$), however, other salts as noted above appear to give a similar reaction with the carboxypolymethylene and provide a similar and useful impregnant.

It is to be particularly noted that carboxypolymethylene in its unneutralized state is acidic and can be neutralized by inorganic and other bases. If the carboxypolymethylene is neutralized for instance with a strong base such as potassium hydroxide or sodium hydroxide, the product is non-reactive to a weak base or salt such as the reactant of the present invention. In a second embodiment of the present invention, the first treatment of the sheet is the impregnation with carboxypolymethylene. This is followed by drying, an impregnation of the salt slurry and by final drying. In sheets treated by the method of the second embodiment, the impregnated reactant is more firmly bonded to the material of the sheet than in the process of the first embodiment. However, there is a tendency for surface material to flake off when prepared by this second method.

Other salts of the alkaline earth metals which have been used with satisfactory results include magnesium oxide, magnesium silicate, calcium hydroxide, calcium silicate and barium oxide.

FIG. 2 depicts a cross section of a typical barrier protecting separator 30 of the invention wherein the pores of the support sheet are small such as are found in a microporous plastic sheet, a paper or a tightly compacted felt. In this instance, the reaction products 32 are confined to one side of the support and only penetrate into a portion of the separator. The nonpenetrated portion is shown as 34.

FIG. 3 depicts a perspective view of a barrier protecting separator wherein the support sheet has comparatively large pores. The fabric 40 of FIG. 3 is shown as a woven fabric. On the surface of the fabric as shown at 42, woven fibers 44 may be found with the reaction product sealing off the interstitial openings. At the edge of the support as shown at 50, the ends of the fibers 52 with the reaction product 46 filling up the space between the fibers are shown.

In the preparation of the barrier protecting separator, every effort is made to fill the interstices of the support sheet either in the surface configuration of FIG. 2 or the in depth configuration of FIG. 3. In practice, this is difficult. It has been found that if the coverage contains an occasional pinhole, the separator will serve its required purpose.

The following examples will serve to illustrate the concept and utility of the present invention:

EXAMPLE I

Two solutions are prepared.

Solution A 25 percent by weight of magnesium hydroxide is suspended by agitation in water.

Solution B 2 percent by weight of carboxy polymethylene (Carbopol — B. F. Goodrich Chemical Co.) is dissolved in water at room temperature. A sheet of non-woven fabric (Webril — E-1411 Kendall Mills) containing Dynel fibers is placed upon a flat surface.

Solution A is poured on the top of the sheet. A doctor blade is pulled across the sheet forcing some of the solution into the pores of the sheet and wiping off excess solution A.

The first treated sheet is then placed in an oven at a temperature of 50° C. until dry. The dried sheet is again laid on a flat surface. Solution B is poured thereon and wiped as before with a doctor blade. Solution B penetrates the dried product of solution A and rapidly reacts therewith. The sheet is placed in the oven a second time and dried at 50° C.

EXAMPLE 2

Primary alkaline galvanic cells were built of a type known as 76. The anode material was zinc and the cathode material a mixture of silver oxide and manganese dioxide. The cells were similar in cross section to the cell of FIG. 1. A barrier of glycerine-free cellophane was used in each cell. An absorbent separator was placed on the cathode side of the barrier. Various materials were used for the absorbent separator as follows:

| Lot | Absorbent Separator Material |
| --- | --- |
| a | Felted PVC and rayon nonwoven fabric (Viskoh 3005 - Chicopee Mills) |
| b | Felted polyester nonwoven fabric (Dynel E-1411 - Kendall Mills) |
| c | Felted PVC and rayon nonwoven fabric (Pellon T21091 - Pellon Corp.) |
| d | Felted PVC and rayon nonwoven fabric (Dexter X2737 - Dexter Corp.) |
| e | Same as B except treated as per Example I |

Cells from each lot were tested as follows:

| Test | |
| --- | --- |
| 1 | Internal resistance of fresh new cells |
| 2 | Flash short circuit current of fresh new cells |
| 3 | Internal resistance following 8 weeks storage at 54° C |
| 4 | Flash short circuit current following 8 weeks storage at 54° C |
| 5 | Ampere hours capacity to 0.90 volts when fresh new cells were dischargd on 300 ohm load. |

Results:

| Lot | Test 1 | Test 2 | Test 3 | Test 4 | Test 5 |
| --- | --- | --- | --- | --- | --- |
| a | 3.86 ohms | .379 amps | 2.78 ohms | .702 amps | .152 AH |
| b | 3.45 | .397 | 3.26 | .698 | .155 |
| c | 4.19 | .345 | 4.46 | .285 | .149 |
| d | 3.71 | .440 | 4.21 | .397 | .151 |
| e | 2.15 | .731 | 2.65 | .657 | 1.56 |

From these tests, it is seen that cells containing the separator of this invention outperformed on all tests, other cells having only absorbent separators.

EXAMPLE 3

Primary alkaline galvanic cells were built of a type known as 675. The anode material of these cells was zinc and the cathode material mercuric oxide. The barrier used in the cells was two layers of glycerine-free cellophane. Barrier protectors were used as follows:

| Lot | Absorbent Separator Barrier Protector |
| --- | --- |
| f | Woven nylon fabric with polyvinyl alcohol coating (Acropor WA - Gillman Co.) |
| g | Felted polyester (Dynel E-1411 - Kendall Mills) treated as per Example I. |

Cells from each lot were tested as follows:

| Test | |
| --- | --- |
| 1 | Internal resistance of fresh new cells |
| 2 | Closed circuit voltage on 167 ohm load - fresh new cells |
| 3 | Internal resistance after 12 weeks storage at 54° C |
| 4 | Closed circuit voltage on 167 ohm load after 12 weeks storage at 54° C. |

| Lot | Test 1 | Test 2 | Test 3 | Test 4 | % dead cells after 12 weeks at 54° C |
| --- | --- | --- | --- | --- | --- |
| f | 2.30 ohm | 153 v | 1.70 ohm | 1.38 v | 47% |
| g | 2.40 ohm | 1.54 v | 1.70 ohm | 1.40 v | 10% |

As in Example 2, this example shows the superiority of separator of the invention over a known and accepted barrier protecting separator.

EXAMPLE 4

Primary alkaline galvanic cells were built of a type known as 22. The anode material of these cells was zinc and the cathode material a mixture of silver oxide and manganese dioxide. Different barriers were evaluated by themselves and in combination with the barrier protecting separator of this invention. The following results were obtained:

| Test Lot | Barrier | Barrier Protecting Separator of This Invention Treated as per Example I | % dead cells after 12 weeks storage at 54° C |
| --- | --- | --- | --- |
| a | glycerine free cellophane | No | 100% |
| b | glycerine free cellophane | Yes | 50 |
| c | paste-organic of U.S. Pat. No. 3,880,672 | No | 65 |
| d | paste-organic of U.S. Pat. No. 3,880,672 | Yes | 40 |
| e | Irradiated polyethylene | No | 25 |
| f | Irradiated polyethylene | yes | 0 |

This example shows the barrier protecting quality of the coated separator of this invention.

Having described my invention, pointed out its differences from the known art and having given examples of its embodiments, I now claim:

1. A barrier protecting separator for use in primary galvanic cells having an alkaline electrolyte which comprises: a porous substrate and embedded in at least a portion of the pores thereof the reaction product of unneutralized carboxy polymethylene and a salt whose anion is chosen from the group that consists of oxide, hydroxide and silicate and whose cation is chosen from the group which consists of magnesium, barium and calcium.

2. A barrier protecting separator as defined in claim 1 wherein the porous substrate is a fibrous fabric.

3. A barrier protecting separator as defined in claim 1 wherein the porous substrate is a sheet with pores therethrough.

4. A sealed primary galvanic cell which comprises: an hermetically sealed container and within the container a cathode, an anode, a barrier, a separator, the separator comprising a porous sheet, the sheet carrying within at least a portion of its pores the reaction product of an alkaline earth metal salt and carboxy polymethylene and an alkaline electrolyte, the electrolyte permeating the cathode, the anode, the barrier and the separator.

5. A sealed primary galvanic cell as defined in claim 4 wherein the cation of the alkaline earth salt is selected from the group which consists of magnesium, barium and calcium and the anion of the salt is selected from the group which consists of oxide, hydroxide and silicate.

6. A sealed primary galvanic cell as defined in claim 4 wherein the porous sheet is a fabric.

7. A sealed primary galvanic cell as defined in claim 4 wherein the porous sheet is a porous plastic sheet.

8. A method of preparing a barrier protecting separator for sealed primary galvanic cells having an alkaline electrolyte which comprises:

a. mixing together to form a slurry, water and a salt of an alkaline earth metal;

b. mixing together to form a solution, water and carboxy polymethylene;

c. applying to a porous sheet a first of the above mixes
d. drying the sheet; and
e. applying to the dried sheet a second of the above mixes.

9. A method as defined in claim 8 wherein the anion of a salt of an alkaline earth metal is selected from the group which consists of oxide, hydroxide and silicate and the cation of the salt is selected from the group which consists of magnesium, barium and calcium.

10. The method of claim 8 wherein the first mix applied to the porous sheet is the mix containing the salt of an alkaline earth metal.

11. The method of claim 8 wherein the first mix applied to the porous sheet is the mix containing carboxy polymethylene.

* * * * *